June 11, 1929.　　　J. L. SHROYER　　　1,717,269
ELECTRIC COOKING DEVICE
Filed May 6, 1925　　　2 Sheets-Sheet 1
Fig. 1.
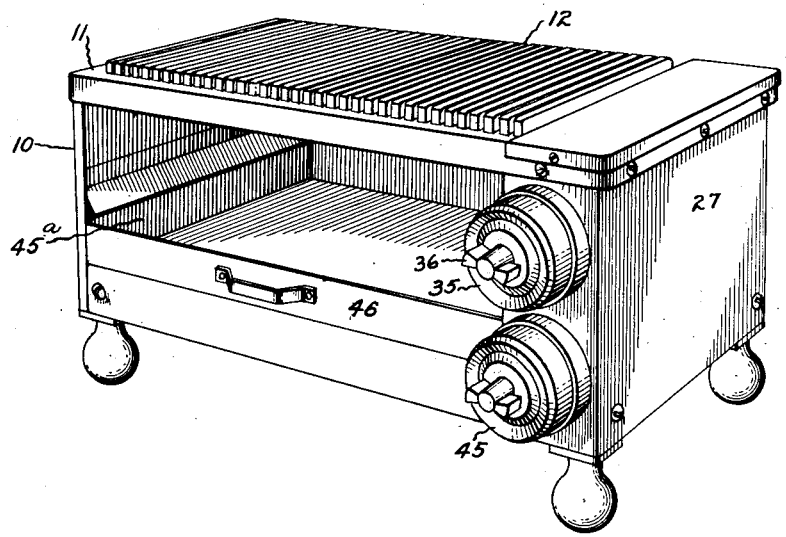
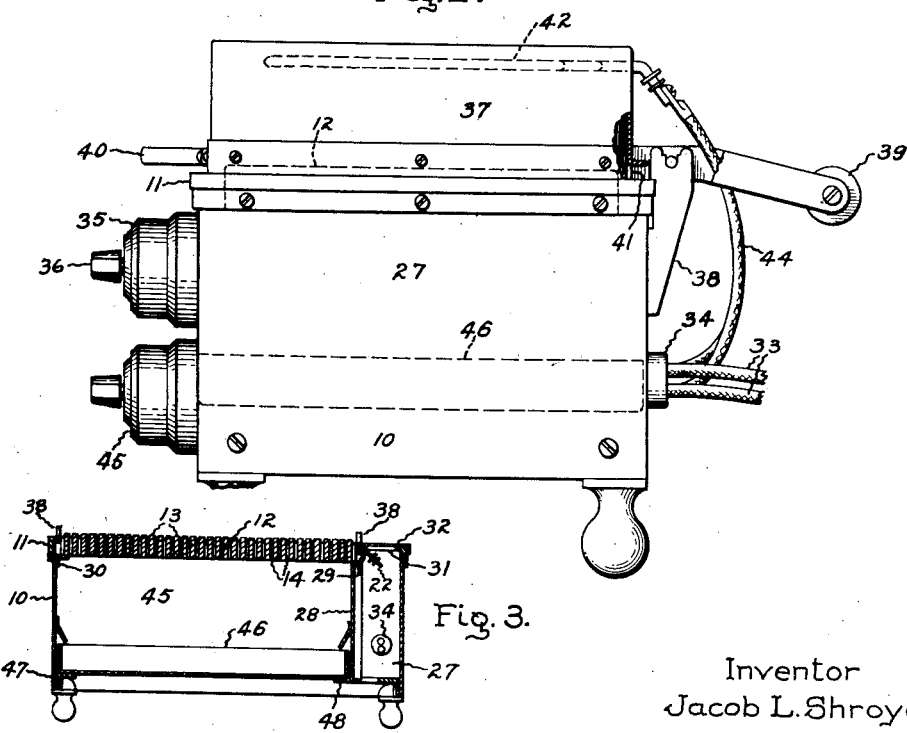
Fig. 2.
Fig. 3.
Inventor
Jacob L. Shroyer
by
His Attorney

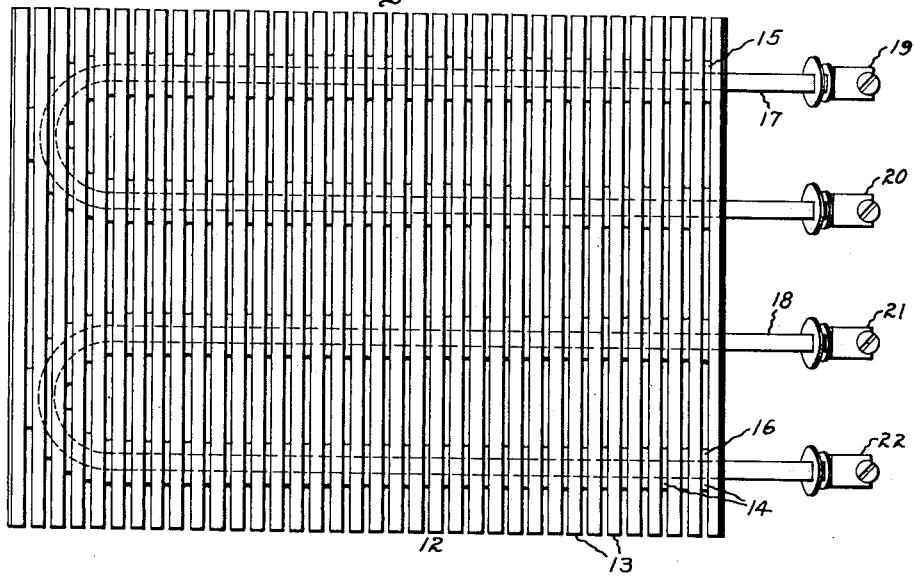
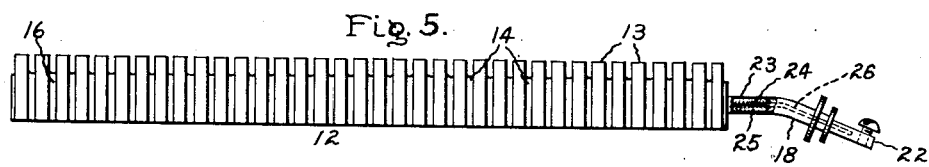
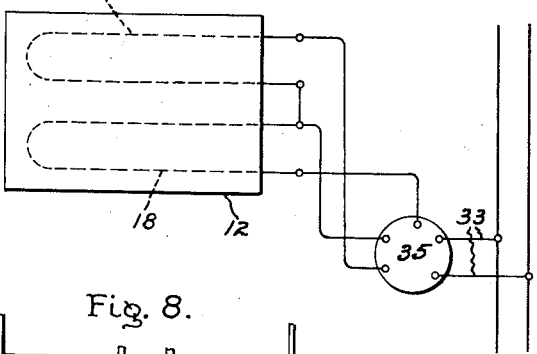
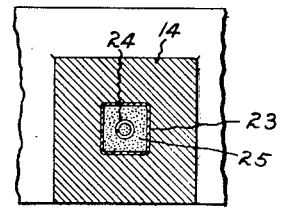
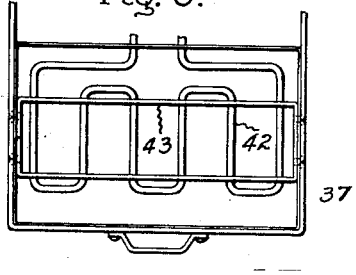
Inventor
Jacob L. Shroyer
by
His Attorney Patented June 11, 1929.

1,717,269

UNITED STATES PATENT OFFICE.

JACOB L. SHROYER, OF OAK PARK, ILLINOIS, ASSIGNOR TO EDISON ELECTRIC APPLIANCE COMPANY, INC., A CORPORATION OF NEW YORK.

ELECTRIC COOKING DEVICE.

Application filed May 6, 1925. Serial No. 28,482.

My invention relates to electric cooking devices, more particularly electric broilers, and has for its object the provision of a broiler in which the food to be broiled is placed on the top of an electrically heated member.

As is well known, the broiling of various foods, such as meat, fish, etc., is accomplished by exposing the food to a source of radiated heat. When an electric source of heat is used, it is impracticable to place the food directly over a radiant heating unit because of the grease which drips down on the heating unit and other parts of the device. A well known arrangement for broiling electrically consists of an overhead heating unit which radiates downward on the food placed below it.

In carrying out my invention I provide an electrically heated broiler which is provided with a top cooking surface on which the food to be broiled is placed. A second heating unit placed above the food may also be used. My invention is particularly useful in hotels and restaurants where the greatest possible amount of cooking must be done in the limited space available.

For a more complete understanding of my invention reference should be had to the accompanying drawings in which Fig. 1 is a perspective view, with the cover removed, of an electric broiler embodying my invention; Fig. 2 is an end elevation view of the broiler shown in Fig. 1; Fig. 3 is a longitudinal sectional view, reduced in size, of the broiler shown in Figs. 1 and 2; Fig. 4 is a plan view of the broiling grid; Fig. 5 is a side elevation view of Fig. 4; Fig. 6 is a fragmentary sectional view of the broiling grid; Fig. 7 is a diagrammatic representation of the electric circuits for the broiler; while Fig. 8 is a bottom plan view of the cover showing the overhead heating unit.

Referring to the drawing, my invention in one form comprises an open front casing 10 which may conveniently be constructed from sheet metal stampings. The top 11 of the casing is provided with a large central opening in which is mounted an electrically heated broiler grid 12, having a top cooking surface on which the meat or other food to be broiled is placed. This grid may be, and preferably is, cast from a suitable material, such as cast iron. As shown in Figs. 4 and 5, the grid 12 comprises a plurality of parallel, spaced bars 13 which are joined together by a series of spacing and connecting members 14 cast integral therewith. These connecting members or parts 14 are positioned on the various bars in such manner as to form with the metal of the bars two hairpin-shaped zones of continuous metal 15 and 16 extending transversely of the bars. In these transversely extending zones of continuous metal are cast two hairpin-shaped electric units 17 and 18. The ends of the heating units project from the side of the grid, and are provided with terminals or binding posts 19–22 inclusive, by means of which the units may be connected to a suitable electric supply circuit.

Any suitable electric heating unit which is adapted to be cast in the metal of the grid may be used for the heating units 17 and 18. Preferably the units 17 and 18 are of the sheathed wire type such, for example, as described and claimed in Patent No. 1,367,341 to Abbott, dated Feb. 1, 1921. As indicated in Fig. 5, each unit comprises an outer metallic sheath 23 in which is a helical electric resistance conductor 24. The resistance conductor is embedded in a compacted mass of powdered electric insulating material 25, such as magnesium oxide, which effectively insulates the resistance conductor from the sheath but at the same time forms an efficient conductor of heat. The ends of the resistance conductor are connected to terminal conductors 26 which in turn are connected to the binding posts 19–22, inclusive, the terminals and binding posts of each unit being electrically insulated from the sheath. As indicated in Fig. 6 the sheath may be shaped to have a square section, the connecting members 14 being likewise square.

The ends of the heating units project for a short distance from the grid, and are bent downward slightly as indicated in Fig. 5. At the end of the casing 10 adjacent to the terminals 19–22, inclusive, a compartment 27 is provided through which the electrical connections are led from the supply source. As shown in Fig. 3, the compartment 27 is formed by the walls of the casing 10 and a partition member 28 secured to the casing. The top of the partition 28 is bent over and forms a ledge 29 on which one end of the grid 12 is supported, the opposite end of the grid being supported on a bracket 30 secured to the opposite end of the casing. An opening 31 is provided in the top 11 to give access into the interior of the compartment 27. This opening 31 is normally closed by means of a lid 32 which is detachably secured to the top 11 by means of suitable screws.

Preferably the leads 33, forming the connection with the supply source, are brought in through an aperture in the rear of the compartment 27, the aperture being provided with an electrically insulating bushing 34. A control switch 35 in the electric circuit with the heating units is mounted on the front of the compartment 27. This control switch may be of a well known snap switch type, being provided with a button 36 which may be turned to various positions, viz, low heat, medium heat and high heat, in addition to an "off" position. Such a switch is sometimes known as a three way switch. Referring to Fig. 7, the switch 35 is arranged to connect the two heaters 17 and 18 in series for low heat, and in parallel for high heat. One heater only is energized for medium heat.

A deep cover 37 is provided for the broiler grid. This cover is pivotally mounted on brackets 38 (only one of which is shown) secured to the rear of the casing 10 and is provided with a counterweight 39 which is not quite heavy enough to overbalance the weight of the cover when in closed position, as shown in Fig. 2, but serves to hold the cover in open position when it is elevated on its pivot. The cover 37 is deep enough to enclose the food being cooked on the grid and thus forms a heating or cooking chamber on top of the grid. It is provided with a handle 40 in front. The lower edge of the cover 37 is bent outward at the rear to provide an opening 41 through which excessive fumes and vapors may escape.

In order to expedite the broiling operation by cooking both sides of the food at the same time, an electric heater 42 is provided in the top of cover 37 for broiling the top of food. This heater may comprise a helical coil sheathed wire heating unit of the same type as units 17 and 18. As shown the heating unit is bent in zigzag formation into a plurality of lengths so as to distribute the generation of heat over the top of the cover. The heater 42 is mounted in a non-oxidizing Monel metal frame 43 which is secured to the cover by means of suitable screws. The ends of the heater 42 are brought out through suitable apertures at the rear of the cover where its terminals are connected by way of conductors 44 to the conductors 33. A suitable snap switch 45 mounted on the front of the casing 10 is included in the electrical circuit with the heater 42 so that the heater may or may not be used with the grid 12 as desired.

A drip pan 46 is slidably mounted in the casing 10 some distance below the grid 12. As shown in Fig. 3 the pan 46 slides at one end on a bracket 47 formed by an angle iron brace extending around the bottom of the casing. The other end of the pan slides on a shelf 48 formed by bending over the lower end of the partition 28. The space 45ª between the pan and the bottom of the grid provides for the free access of air to the grid. The air circulates upwards between the bars of the grid, and has a very appreciable beneficial effect in the proper broiling of the food. In addition to providing for access of air to the food, the openwork construction of the grid allows the grease to drip downward between the bars into the pan 46 beneath. It will be observed that the heating unit in the grid is completely protected from the drippings by the metal in which it is cast.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. An electric cooking device comprising a top surface cooking grid, electric heating means for said grid comprising a resistance element imbedded in powdered electric resistance material and entirely surrounded by a metallic sheath. Said sheathed electric resistance element being wholly concealed in said grid so as to be protected from grease dripping through said grid from food cooking on said grid.

2. An electric cooking device comprising a top surface cooking grid, an electric heating unit cast in the structure of said grid, and a cover arranged to be set over said grid to form a cooking chamber therewith.

3. An electric cooking device comprising a grid of parallel metallic bars on which the food to be cooked is placed, an elongated electric heating unit mounted and concealed in said grid in a position substantially at right angles to said bars and a support for said grid providing for free access of air upward through said grid to the food cooking thereon.

4. An electric cooking device comprising a cast grid on which the food to be cooked is placed, an electric heating unit cast in said grid, and a support for said grid permitting access of air upward through said grid to the food cooking thereon.

5. An electric broiler comprising an open front casing, a cast broiler grid secured in the top of said casing, a sheathed wire electric heating unit cast in said grid, and a cover arranged to be placed over said grid to form therewith a cooking chamber, air being free to circulate through the open front of said casing upward around said grid.

6. An electric broiler comprising an open front casing, a cast broiler grid secured in the top of said casing having a top broiling surface, an electric heating unit cast in said grid, a cover pivotally mounted on said casing arranged to be placed over said grid to form therewith a cooking chamber, air being free to circulate through the open front of said casing upward around said grid, and a drip pan underneath said grid.

7. An electrically heated cooking grid constituting a plurality of spaced parallel bars joined by integral spacing members located to form with said bars a continuous zone of metal extending across said grid, and an electric heating unit cast in said zone.

8. An electric cooking device comprising a cast grid constituting a plurality of spaced parallel bars joined by integral spacing members located to form with said bars a continuous hairpin shaped zone of metal extending across said grid, an electric heating unit cast in said zone, and an open front support for said grid.

9. An electric broiler comprising an open front casing, a cast broiler grid secured in the top of said casing, an electric heating unit cast in said grid, a cover arranged to form with said grid a cooking chamber, and an electric heating unit in said cover.

In witness whereof, I have hereunto set my hand this 27 day of April 1925.

JACOB L. SHROYER.